(12) United States Patent
Arnold et al.

(10) Patent No.: US 6,523,168 B1
(45) Date of Patent: Feb. 18, 2003

(54) REDUCTION OF OBJECT CREATION DURING STRING CONCATENATION AND LIKE OPERATIONS THAT UTILIZE TEMPORARY DATA STORAGE

(75) Inventors: Jeremy Alan Arnold, Rochester, MN (US); Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,345

(22) Filed: Jul. 1, 1999

(51) Int. Cl.[7] .............................. G06F 9/44; G06F 9/45
(52) U.S. Cl. ...................... 717/116; 717/118; 717/148; 717/151
(58) Field of Search ................................. 717/108, 151, 717/165, 148, 153, 116, 118, 154

(56) References Cited

U.S. PATENT DOCUMENTS

| | | | | | |
|---|---|---|---|---|---|
| 4,843,545 A | * | 6/1989 | Kikuchi | ....................... | 395/707 |
| 5,481,708 A | * | 1/1996 | Kukol | ....................... | 395/709 |
| 5,535,391 A | * | 7/1996 | Hejlsberg et al. | ............ | 395/709 |
| 5,805,895 A | * | 9/1998 | Breternitz, Jr. et al. | ...... | 395/709 |
| 5,842,017 A | * | 11/1998 | Hookway et al. | ............ | 395/707 |
| 5,872,977 A | * | 2/1999 | Thompson | ................... | 395/703 |
| 5,898,875 A | * | 4/1999 | Nakamura et al. | ........... | 395/712 |
| 5,923,883 A | * | 7/1999 | Tanaka et al. | ............... | 395/709 |
| 5,937,196 A | * | 8/1999 | Schmidt et al. | .............. | 395/709 |
| 6,289,507 B1 | * | 9/2001 | Tanaka et al. | .................. | 717/9 |

OTHER PUBLICATIONS

"The Design and Evolution of C++", Bjarne Stroustrup, p. 194, published Mar. 9, 1994.*
Gosling, James et al., *The Java™ Language Specification*, Addison–Wesley, (1996), pp. 355–358 and 548–557.

* cited by examiner

*Primary Examiner*—Kakali Chaki
*Assistant Examiner*—Todd Ingberg
(74) *Attorney, Agent, or Firm*—Wood, Herron & Evans, LLP

(57) ABSTRACT

Reduction of object creation during string concatenation and like operations that utilize temporary data storage during translating a first computer program into a second computer program in which program code is generated to utilize a reusable temporary object in the performance of multiple operations that require the use of temporary storage, e.g., string concatenation operations. As such, the reusable temporary object need only be allocated once, in contrast with conventional implementations where multiple temporary objects would otherwise need to be allocated in the performance of such operations. Consequently, the additional overhead associated with allocating memory for additional objects, as well as collecting such objects once they are no longer in use, is eliminated, thereby improving overall performance while handling such multiple operations.

33 Claims, 3 Drawing Sheets

REDUCTION OF OBJECT CREATION DURING STRING CONCATENATION AND LIKE OPERATIONS THAT UTILIZE TEMPORARY DATA STORAGE

FIELD OF THE INVENTION

The invention is generally related to computers and computer software. More specifically, the invention is generally related to compilation and interpretation of string concatenations and other operations that utilize temporary data storage.

BACKGROUND OF THE INVENTION

Managing memory is critically important to the performance and reliability of a data processing system such as a computer. Specifically, data used by a computer program is typically stored in a computer within a memory that has a limited address space. In many computers, data is stored in the form of "objects" that are allocated space in a portion of the memory referred to as an "object heap".

In many computer environments, objects are created, or "allocated", dynamically (i.e., on an as-needed basis) during the execution of a computer program. In addition, given that the amount of memory available in a computer is limited, some mechanism for removing, or "deallocating", unused objects is also provided, typically either through the use of specific program instructions or through an automated process known as garbage collection. One well known computer programming environment that utilizes dynamic memory allocation, for example, is the Java programming environment developed by Sun Microsystems.

One primary benefit of dynamic memory allocation is that the overall amount of memory required to run a computer program is typically reduced, often reducing the memory requirements of a computer upon which the program is executed, or permitting more computer programs to share a given memory space in the computer. Computer performance may also benefit due to the reduced memory requirements, since less swapping of data into and out of memory may be required. Another benefit is that overall reliability of the computer is often improved since memory usage is typically better managed.

The primary drawback to dynamic memory management, however, is the additional "overhead" that is associated with both allocating and deallocating objects. Allocating and deallocating an object each require the computer to perform certain operations that are outside of the actual productive operations that are being performed during execution of a computer program. These additional operations delay the performance of the productive operations, which typically slows the overall operation of the computer. Therefore, for performance concerns, it is highly desirable to minimize whenever possible the number of object allocation and deallocation operations performed by a computer program.

The overhead associated with object allocation and deallocation is of particular concern with respect to computer operations that rely on "temporary" data storage. In particular, with objects that are used repeatedly over a significant period of time, the overhead associated with allocating and deallocating those objects becomes relatively insignificant compared to the productive operations that are performed with those objects. In contrast, whenever objects are only used for a brief period of time, the overhead associated with allocating and then deallocating the objects becomes more significant relative to the productive operations performed with those objects. Furthermore, although the overhead associated with each allocation and deallocation may be relatively minor, when the effects of a large number of operations that rely on temporary objects are considered, the collective impact on overall computer performance can be substantial.

A skilled computer programmer can in some instances reduce the number of object allocation and deallocation operations in a computer program during development of the computer program. In other instances, however, the programmer may not be able to control when some objects are allocated and/or deallocated. For example, a programmer writing a computer program in a source code, or human-readable format, may need to use certain instructions that, when translated into a machine-readable or intermediate format, inherently result in the creation of temporary objects due to the design of the particular translation program (e.g., a compiler or interpreter) used to translate the computer program to the machine-readable or intermediate format.

One such example is a string concatenation operation in the Java programming environment. A string concatenation operation, which is designated by the "+" operator in Java, creates a new string from the two objects identified as arguments to the operation. For example, the concatenation of a first string such as "start" with a second string such as "le" would result in the creation of a new string "startle".

Compilation of a string concatenation statement in a Java source code program by a Java compiler results in the generation of program code that utilizes a temporary mutable string object, known in Java as a "StringBuffer" object, in performing the string concatenation operation. As an example, Table I below illustrates an exemplary "myExample" Java class that includes an "exampleConcat" procedure that receives two arguments "s1" and "s2" and returns a "result" object that is the concatenation of the data in the "s1" and "s2" arguments:

TABLE I

Example String Concatenation

```
public class myExample {
    public String exampleConcat(String s1, String s2) {
        String result = s1 + s2;
        return (result);
    }
}
```

Compilation of the statement "String result=s1+s2" using a conventional Java compiler results in the generation of program code that generally corresponds to the statement shown in Table II below:

TABLE II

Conventional String Concatenation Compilation

String result = new StringBuffer(String.valueOf(s1)).append(s2).toString();

The above statement can be parsed into the following operations:
1. String.valueOf(s1)—returns a string representation of "s1"
2. new StringBuffer( . . . )—creates a new "StringBuffer" object containing the string representation of "s1"
3. .append(s2)—appends "s2" to the "StringBuffer" object
4. .toString( )—creates a new "String" object from the "StringBuffer" object Operation 2 above results in the allocation of two objects: a StringBuffer object and an underlying character array object used by the StringBuffer object. Operation 4 above creates one additional object: a String object that is returned as the result of the operation. Operations 1 and 3 typically do not result in the creation of any objects, although in some circumstances additional objects may need to be created handle format conversion, for example if either s1 or s2 was in a format other than a string (e.g., an integer, a boolean value, etc.), or when the existing character array is not large enough to hold all of the characters in s1 and s2. Therefore, a minimum of three objects are created for each string concatenation operation. Of these three objects, the StringBuffer object and its underlying character array object are not used after completion of the string concatenation operation. In most circumstances, both such objects are eventually deallocated by the Java garbage collector some time after completion of the string concatenation operation.

String concatenation operations are used extensively in a number of Java applications such as manipulating results from database files, and generating dynamic documents (e.g., hypertext markup language (HTML) documents and the like), among others. As such, it is possible in many applications for string concatenations to result in the creation of a relatively large number of temporary objects, which can have a significant negative impact on overall system performance.

Therefore, a substantial need exists in the art for a manner of improving the performance of a computer in performing operations that rely on temporary data storage, and in particular, for a manner of improving the performance of a computer in performing string concatenations and other like operations.

SUMMARY OF THE INVENTION

The invention addresses these and other problems associated with the prior art by providing an apparatus, program product, and method of translating a first computer program into a second computer program in which program code is generated to utilize a reusable temporary object in the performance of multiple operations that require the use of temporary storage. As such, the reusable temporary object need only be allocated once, in contrast with conventional implementations where multiple temporary objects would otherwise need to be allocated in the performance of such operations. Consequently, the additional overhead associated with allocating memory for additional objects is eliminated, which improves overall performance while handling such multiple operations. Furthermore, in implementations where objects need to be collected (either explicitly or through automatic collection), the additional overhead associated with collecting the additional objects when they are no longer in use is also avoided, providing further improvements in performance over conventional implementations.

In one specific, but by no means exclusive, implementation, a reusable temporary object is provided in the form of a mutable string object, which is utilized in the performance of string concatenation operations in the Java programming environment. Consequently, rather than creating a new mutable string object (as well as an underlying character array object) for each string concatenation operation, an existing mutable string object, allocated at the initialization of a program (or a thread thereof), is used as the temporary storage for each operation. The total number of objects created as a result of multiple string concatenation operations is therefore reduced, easing allocation and collection overhead, and accordingly improving overall system performance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
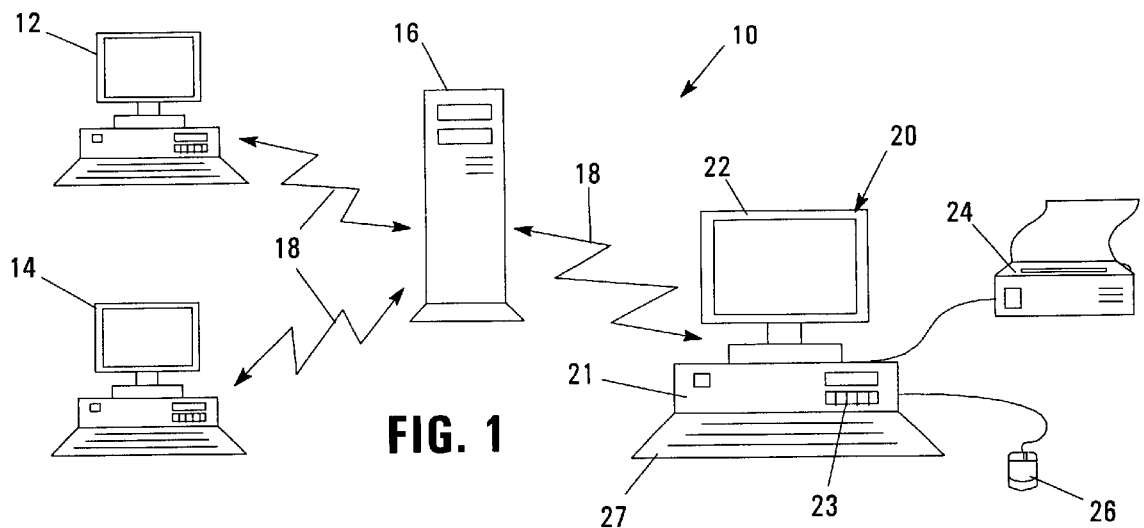
FIG. 1 is a block diagram of a networked computer system consistent with the invention.

The illustrated embodiments of the invention generally operate by reusing a temporary object during execution of a computer program to perform multiple operations that otherwise require some form of temporary data storage. Such an object is allocated and reused by program code that has been generated by a translation program during translation of a first computer program into a second computer program. By doing so, the frequency at which temporary objects are created is reduced, thereby eliminating the overhead associated with creating such objects, and in some environments, eliminating the additional overhead associated with collecting those objects after they are no longer being used. As a result, overall performance is often improved.

A reusable temporary object consistent with the invention may be used in the performance of a wide variety of computer operations that require some form of temporary data storage. For example, the specific implementation discussed hereinafter focuses on the utilization of a reusable temporary object in connection with performing string concatenation operations, e.g., in a Java or other object-oriented environment. However, it will be appreciated that other string-based operations may also utilize a reusable temporary object consistent with the invention. Furthermore, the invention may also have benefit when used with other types of computer operations that rely on temporary data storage.

A reusable temporary object consistent with the invention may also include any number of types of data storage objects, principally based upon the type of temporary storage required by the operations that will utilize the object. Consequently, in the specific implementation described hereinafter, the reusable temporary object may be a mutable string object, e.g., a StringBuffer object as defined by the Java programming language, which includes as a component thereof a character array object, as is well known in the art. However, given that other types of operations may require other forms of temporary data storage, a reusable temporary object may utilize a multitude of other data formats consistent with the invention.

The generation of program code to reuse a reusable temporary object is performed by a translation program, typically in response to a determination that a particular operation requires temporary data storage. As such, the generation of program code is essentially an optimization that is independent of any specific program code inserted into a computer program by a computer programmer. Often, the determination of whether a particular operation requires temporary data storage is based upon determining the type of operation, e.g., whether the operation is a string concatenation, since in many instances a given type of operation will either always or never require some form of temporary data storage.

A translation program consistent with the invention may incorporate a compiler to generate suitable program code for reusing a reusable temporary object during compilation of source code into either an executable or an intermediate representation. For example, in the specific implementation described hereinafter, the generation of program code is performed by a Java compatible compiler when generating a Java bytecode or intermediate representation, i.e., a class file, from a Java source code program. However, it will also be appreciated that program code generation may also be performed when compiling a computer program into native executable program code, e.g., in the c++ programming language, or when compiling Java bytecodes into native code with a static compiler, among other environments. Furthermore, program code generation consistent with the invention may also be performed during interpretation of a computer program, e.g., when interpreting Java bytecodes into corresponding native instructions, and thus a translation program consistent with the invention may include an interpreter (e.g., a Java virtual machine) in lieu of or in addition to a compiler. Moreover, in some environments compilation may be performed "just-in-time", and as such a just-in-time compiler may also be used to implement all or a portion of the functionality of a translation program consistent with the invention. Furthermore, given the generation of program code may be performed at one or more of the above-described stages, it will be appreciated that the computer program being translated, as well as the computer program being generated as a result of the translation process, may be utilized using any number of representations, whether human or machine readable in nature. Consequently, the invention should not be limited to the compilation of human readable source code into an intermediate class file representation as is specifically described hereinafter.

Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
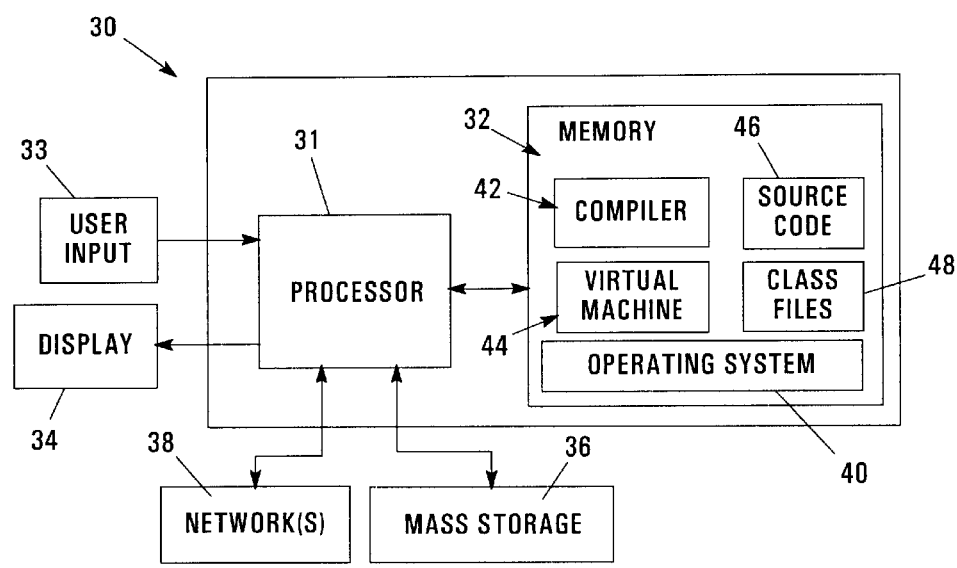
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., compiler 42, virtual machine 44, source code 46 and class files 48, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tapes, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Reduction of Object Creation During String Concatenation

The specific embodiment described hereinafter focus on a particular application of the invention in optimizing the performance of computer programs executed in the Java programming environment developed by Sun Microsystems. However, it should be appreciated that the invention may have applicability in other programming environments that utilize temporary objects in performing computer operations, particularly string operations such as string concatenations and the like.

Figure 3:
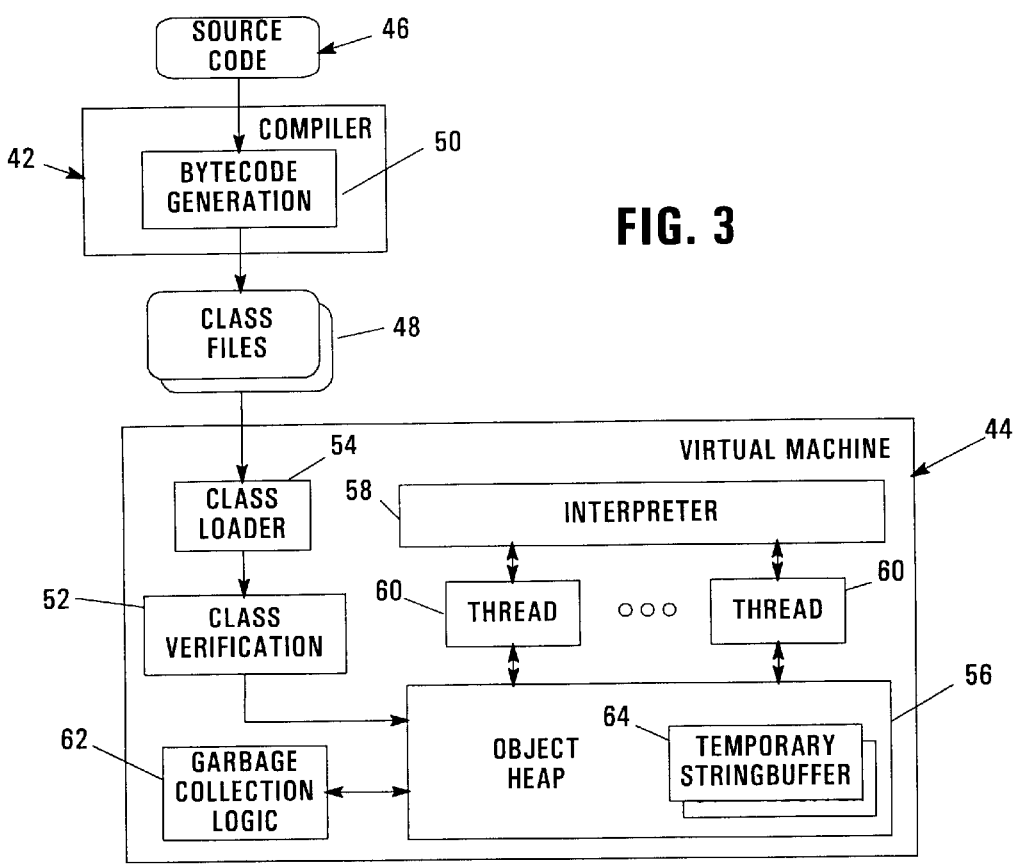
FIG. 3 is a block diagram of the software components in the environment of FIG. 2.

FIG. 3 illustrates the primary software components utilized in the illustrated embodiment. Specifically, FIG. 3 shows a compiler 42 coupled to a virtual machine 44, with the compiler receiving as input source code 46 and outputting in response thereto one or more class files 48 capable of being executed by virtual machine 44.

Each of components 42–48 is configured to be compatible with the various known Java language specifications. Source code 46 is a human-readable Java source code representation of a computer program. Compiler 42 is utilized to generate from the Java source code 46 a plurality of bytecodes that represent an intermediate representation of a Java computer program, as illustrated at block 50. Additional optimization stages may also be incorporated into compiler 42 consistent with the invention.

The generated bytecodes are organized into one or more classes, representing the templates for the objects that are to be allocated and utilized during execution of the computer program by virtual machine 44. The classes are organized into class files 48 containing both the executable bytecodes and data relied upon by such executable code. Other information about an object is also typically included within the class file, as is known in the art.

Once generated, class files may be distributed to third parties and/or stored to some persistent medium for later execution, or may be immediately executed by virtual machine 44. Virtual machine 44 implements a Java Virtual Machine (JVM), which essentially emulates the operation of a hypothetical microprocessor on a specific computer platform. Different virtual machines may be utilized to permit the class files to be executed on different platforms. Moreover, it should be appreciated that compiler 42 and virtual machine 44 need not reside on the same computer system.

Class files are loaded by virtual machine 44 using a class loader component 54, in a manner generally known in the art. Once loaded, the classes in the class files are processed by a class verification block 52, which performs various verification and analysis operations on the classes to ensure that the classes are error free and will not cause various run-time errors, as well as that all security requirements of the Java language are met.

To provide working storage during execution of the computer program, virtual machine 44 includes an object heap 56. Data storage is allocated during runtime, and is periodically cleaned up (with unused objects discarded) by garbage collection logic represented at 62. Any number of known garbage collection schemes may be used consistent with the invention.

In response to the loading and verification of classes in blocks 54 and 52, one or more threads 60 are executed by an interpreter 58 that generates for each bytecode suitable native code appropriate for the platform upon which the virtual machine executes. It will be appreciated that the interpretation and execution of Java bytecodes by virtual machine 44 are operations that are well known in the art. Additional modifications to the virtual machine, including just-in-time compilation, among other alternatives, may also be implemented in virtual machine 44 consistent with the invention.

In the illustrated implementation of FIG. 3, the optimization described herein is implemented within bytecode generation block 50 of compiler 42, which has the benefit of requiring no specific modifications to the virtual machine or to any Java computer programs or class files. In other implementations, however, the optimization may be performed in other stages of compiler 42, as well as during interpretation by virtual machine 44 or during compilation by a static compiler that compiles the Java class files generated by compiler 42 into native instructions for a particular computer platform. The optimization relies on one or more temporary StringBuffer objects 64, illustrated as resident in object heap 56.

Figure 4:
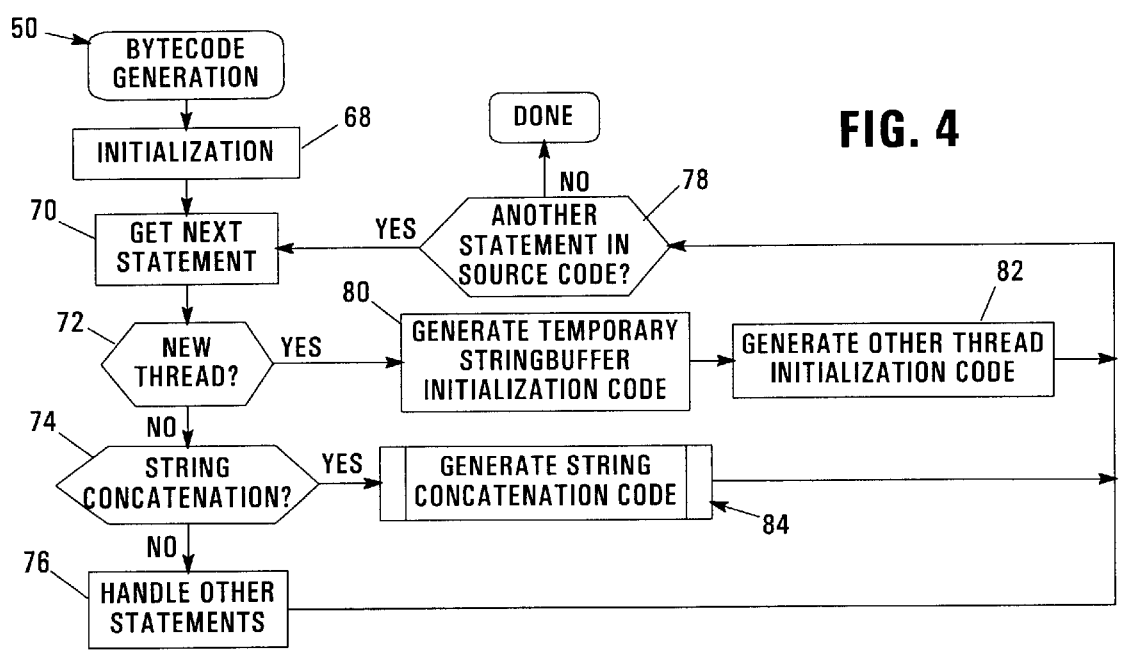
FIG. 4 is a flowchart illustrating the program flow of the bytecode generation block of FIG. 3.

FIG. 4 illustrates the general program flow of bytecode generation block 50 in greater detail. After routine initialization in block 68 (which may include, for example, retrieval of the source code from mass storage), a loop is initiated in block 70 to process each statement in the source code program provided to the compiler. Block 70 retrieves the next unprocessed statement from the source code program. Next, block 72 determines whether the statement is to create a new execution thread. If not, control passes to block 74 to determine whether the statement is a string concatenation statement. If not, control passes to block 76 to handle the statement in a conventional manner, as is well known in the art. Control then passes to block 78 to determine whether additional unprocessed statements exist in the source code, and if so, control returns to block 70 to process the next statement. Once all statements have been processed, block 78 terminates the bytecode generation process.

Returning to block 72, in the illustrated implementation, one reusable temporary StringBuffer object is utilized for each execution thread of a Java computer program. As such, whenever a statement to initialize a new thread is detected in the source code, block 72 passes control to block 80 to generate temporary StringBuffer initialization code for the resulting class file to initialize a new temporary StringBuffer object (also identified hereinafter as a "tsb" object) for the thread. One suitable source code representation of temporary StringBuffer initialization code is shown below in Table III:

TABLE III

Temporary StringBuffer Initialization Code

StringBuffer tsb = new StringBuffer();

The initialization code can initially allocate any size of reusable temporary StringBuffer object, since the StringBuffer class will automatically allocate additional memory for a StringBuffer object as it is needed. However, to minimize the allocation of additional memory during the performance of string concatenation operations, it may be desirable in some implementations to initially allocate a relatively large StringBuffer object. It will be appreciated that the generation of bytecodes corresponding to the above source code representation is well within the ability of one of ordinary skill in the art having the benefit of the instant disclosure.

Returning to block 80 of FIG. 4, once the temporary StringBuffer initialization code is generated, additional program code is generated in block 82 for initializing the thread, in a manner well known in the art. Control then returns to block 78.

Figure 5:
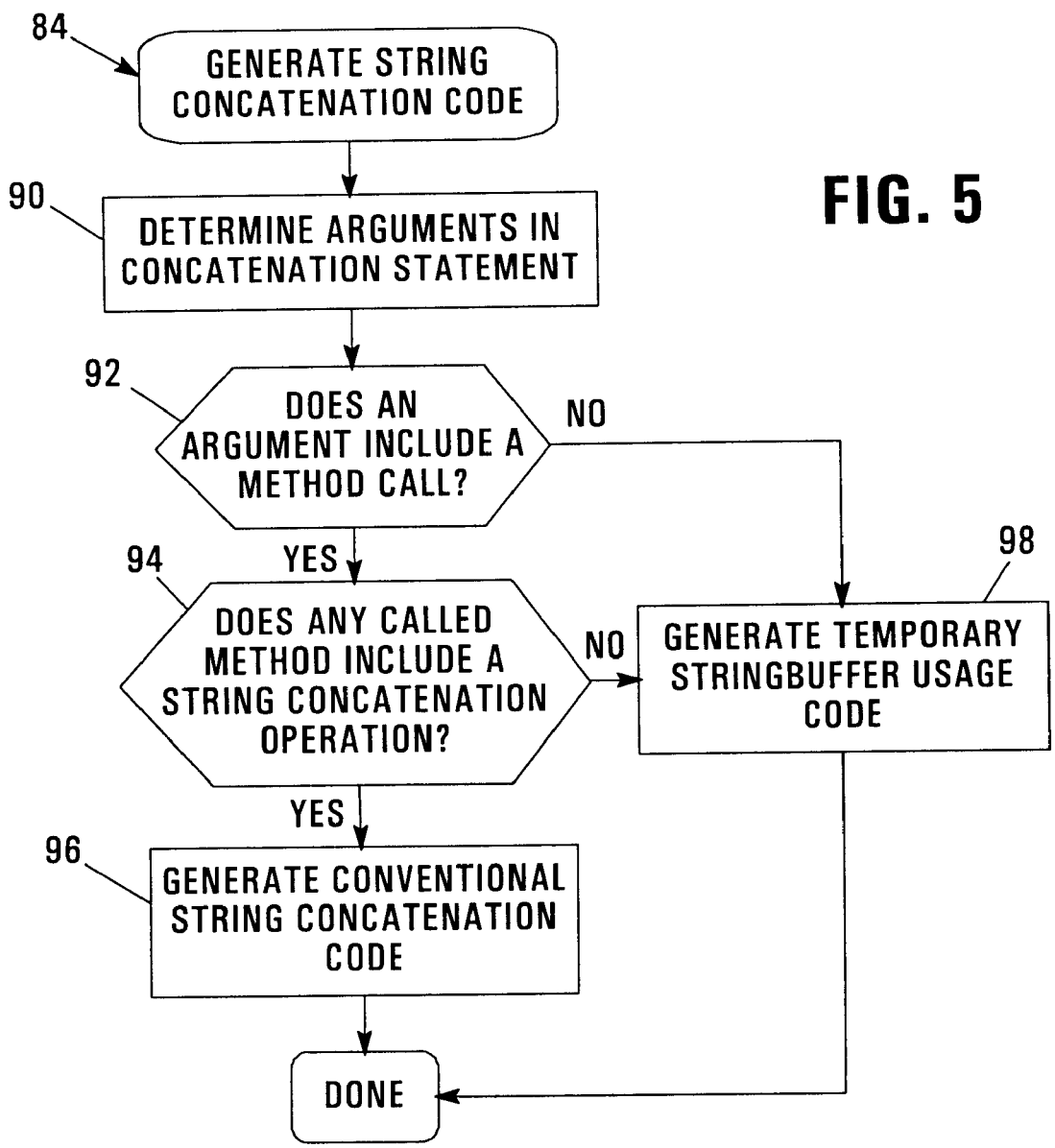
FIG. 5 is a flowchart illustrating the program flow of the generate string concatenation code referenced in FIG. 4.

Next returning to block 74, detection of a string concatenation statement results in control passing to a generate string concatenation code routine 84, prior to returning control to block 78. One suitable implementation of routine 84 is illustrated in FIG. 5, where control begins in block 90 by determining the arguments to the string concatenation statement, an operation that is well known in the art.

Next, block 92 attempts to prevent the possibility of conflicting use of the reusable temporary StringBuffer object, e.g., due to an argument of a string concatenation operation calling a method that includes another string concatenation operation. In the illustrated implementation, detection of a conflicting operation is performed by determining in block 92 whether any argument includes a method call (e.g., an operation such as "String result=s1+ someMethod( );" where "someMethod( )" returns a String object). If so, block 94 next determines whether any method called by any argument could result in a string concatenation operation, and if so, control passes to block 96 to generate conventional string concatenation code, e.g., similar to the format illustrated above in Table II. Processing of the string concatenation operation is then complete. Typically, a string concatenation operation included in another method can only be determined if the method is a private or final method, since such a method cannot be overridden.

In other implementations, it may be desirable to omit block 94, and simply generate conventional string concatenation code whenever an argument includes a method call. In still other implementations, runtime analysis can be performed to determine whether a conflict will exist during execution of the program, with the conventional string concatenation code generated only when a runtime conflict is detected. Other modifications will be apparent to one of ordinary skill in the art having the benefit of the instant disclosure.

Returning to blocks 92 and 94, if no argument to the string concatenation operation includes a method call, or if no method called by an argument includes a string concatenation operation, control passes to block 98 to generate temporary StringBuffer usage code to utilize the reusable temporary StringBuffer object in the performance of the string concatenation operation, prior to terminating routine 84.

A source code representation of one suitable temporary StringBuffer usage code implementation is illustrated in Table IV below:

TABLE IV

Temporary StringBuffer Usage Code tsb.setLength(0);
String result = tsb.append(s1).append(s2).toString();

The first statement "tsb.setLength(0)" simply clears the reusable temporary StringBuffer object for the thread. The second statement "String result=tsb.append(s1).append(s2) .toString( )" can be parsed into the following operations:

1. tsb.append(s1)—appends "s1" to the reusable temporary StringBuffer object
2. .append(s2)—appends "s2" to the reusable temporary StringBuffer object
3. .toString( )—creates a new "String" object from the reusable temporary StringBuffer object It will be appreciated that if more than two arguments are supplied to a string concatenation operations, the program code of Table IV would simply require the use of additional "appends" operations to concatenate the additional arguments.

Of the operations represented by the statements in Table IV, only the "toString( )" necessarily creates an object, compared to the minimum of three objects that are necessarily created by conventional string concatenation usage code (as described above in connection with Table II). Thus a reduction in object allocations and deallocations associated with string concatenation operations of up to 66% may be realized in many applications. Particularly in applications where numerous string concatenation operations are used, the performance benefits can be substantial.

In some instances, as with conventional code, additional objects may be created as a result of the code illustrated in Table IV, typically to perform format conversion during the append operations for non-string arguments, or whenever the amount of data appended to the reusable temporary StringBuffer object exceeds the allocated memory for the object. As discussed above, the latter allocation can be minimized by initially allocating memory for a relatively large reusable temporary StringBuffer object, although even if a smaller object is allocated, over time the size of the object would grow such that later string concatenation operations would rarely (if ever) require the allocation of additional memory.

Various modifications may be made to the illustrated embodiments consistent with the invention. For example, rather than attempting to determine a conflicting operation that utilizes a reusable temporary StringBuffer object during compilation, such a determination could be performed during runtime. One temporary StringBuffer usage code implementation suitable for performing runtime checking is illustrated below in Table V:

TABLE V

Alternate Temporary StringBuffer Usage Code

```
String result = null;
ExtendedThread currentThread = ExtendedThread.currentThread();
if (currentThread.tsbInUse())
    result = new StringBuffer(String.valueOf(s1)).append(s2).toString();
else {
    currentThread.setTsbInUse(true);
    tsb.setLength(0);
    result = tsb.append(s1).append(s2).toString();
    currentThread.setTsbInUse(false);
}
```

With the program code of Table V, an additional boolean flag "TsbInUse" is added to the Thread class (typically by extending the Thread class, as represented by the class "ExtendedThread"), indicating whether the reusable temporary StringBuffer object is currently in use. If so, conventional string concatenation code is executed. If not, program code corresponding to Table IV is executed, with a lock implemented by first setting, and then resetting the flag once the string concatenation operation is complete (e.g., using a "setTsbInUse( )" method provided in the extended Thread class "ExtendedThread"). Other known manners of implementing a lock or other synchronization mechanism may also be used in the alternative. Furthermore, rather than extending the Thread class, other manners of providing an in use flag that is globally-available to a thread may also be used. In addition, rather than determining the current thread during each string concatenation operation (in line 2 of Table V), a current thread identifier could be obtained during thread initialization.

It should also be appreciated that in single threaded applications, only one reusable temporary StringBuffer object may be required. Furthermore, allocation of the object may be performed at different instances, e.g., at the beginning of the main( ) routine for a compiled Java program. Even in multi-threaded applications, a single object could be used, with some form of synchronization mechanism (e.g., a lock) used to synchronize access to the reusable temporary object.

Furthermore, in other implementations, it may be desirable to utilize a pool of reusable temporary StringBuffer objects for use either by individual threads or by all threads executing in a program. For example, Tables VI and VII below illustrate additional alternate temporary StringBuffer initialization and usage code implementations suitable for selecting between multiple reusable temporary StringBuffer objects, wherein a stack object referred to as "tsbStack" is used to store the pool of StringBuffer objects. Moreover, it is assumed that each thread has its own stack, and thus that no synchronization between threads is required for each stack of StringBuffer objects.

TABLE VI

Alternate Temporary StringBuffer Initialization Code

Stack tsbStack = new Stack();

TABLE VII

Alternate Temporary StringBuffer Usage Code

```
String result = null;
if (tsbStack.empty()) {
    StringBuffer tsb = new StringBuffer(String.valueOf(s1).append(s2));
    result = tsb.toString();
    tsbStackpush(tsb);
}
else {
    StringBuffer tsb = tsbStack.pop();
    tsb.setLength(0)
    result = tsb.append(s1).append(s2).toString();
    tsbStackpush(tsb);
}
```

Other data structures may be used to store a pool of StringBuffer objects consistent with the invention. Moreover, additional modifications will be apparent to one of ordinary skill in the art. Therefore, the invention lies in the claims hereinafter appended.

What is claimed is:

1. A method of translating a first computer program into a second computer program, the method comprising:

(a) generating program code for the second computer program that allocates a reusable temporary object for handling multiple operations in the second computer program that require the use of temporary storage; and (b) for each of a plurality of operations defined in the first computer program that require the use of temporary storage, generating program code in the second computer program to utilize the reusable temporary object in performing the operation.

2. The method of claim 1, wherein each of the plurality of operations includes a string concatenation operation.

3. The method of claim 1, wherein the first computer program includes Java compatible source code, and wherein the second computer program includes Java compatible bytecodes.

4. The method of claim 1, wherein generating the program code for the second computer program is performing during compilation of the first computer program into the second computer program.

5. The method of claim 1, wherein generating the program code for the second computer program is performing during interpretation of the first computer program.

6. The method of claim 1, wherein the reusable temporary object and the plurality of operations are associated with a first execution thread, the method further comprising:
(a) generating program code for the second computer program that allocates an additional reusable temporary object storage for handling operations in the second computer program that are associated with a second execution thread and that require the use of temporary storage; and
(b) for each of a second plurality of operations defined in the first computer program, associated with the second execution thread, and that require the use of temporary storage, generating program code in the second computer program to utilize the additional reusable temporary object in performing the operation.

7. The method of claim 1, wherein the reusable temporary object includes a mutable string object.

8. The method of claim 7, wherein the reusable temporary object further includes a character array object referenced by the mutable string object.

9. The method of claim 1, further comprising:
(a) detecting a conflicting operation in the first computer program that requires the use of temporary storage; and
(b) generating program code in the second computer program to generate local temporary data storage for use in performing the conflicting operation.

10. The method of claim 1, further comprising determining whether an operation requires temporary data storage, wherein generating program code in the second computer program to utilize the reusable temporary object in performing the operation is performed responsive to determining that the operation requires temporary data storage.

11. The method of claim 10, wherein determining whether an operation requires temporary data storage includes determining whether the operation is a predetermined type of operation.

12. The method of claim 11, wherein determining whether the operation is a predetermined type of operation includes determining whether the operation is a string concatenation operation.

13. The method of claim 1, further comprising, for each of the plurality of operations defined in the first computer program that require the use of temporary storage, generating program code in the second computer program to initialize the reusable temporary object prior to using the reusable temporary object in performing the operation.

14. The method of claim 1, further comprising, for each of the plurality of operations defined in the first computer program that require the use of temporary storage, generating program code in the second computer program to determine during execution of the second computer program whether the reusable temporary object is currently in use prior to using the reusable temporary object in performing the operation.

15. The method of claim 1, further comprising, for each of the plurality of operations defined in the first computer program that require the use of temporary storage, generating program code in the second computer program to select, during execution of the second computer program, among a plurality of reusable temporary objects to be used in performing the operation.

16. A method of compiling Java source code into at least one Java class file, the method comprising:
(a) generating program code for the Java class file that allocates a reusable temporary stringbuffer object; and
(b) for each of a plurality of string concatenation statements in the Java source code, each of which including a plurality of arguments, generating program code in the Java class file that initializes the reusable temporary stringbuffer object and appends each argument in the string concatenation statement to the reusable temporary stringbuffer object.

17. An apparatus, comprising:
(a) a memory; and
(b) a translation program, resident in the memory, the translation program configured to translate a first computer program into a second computer program, the translation program further configured to generate program code for the second computer program that allocates a reusable temporary object for handling multiple operations in the second computer program that require the use of temporary storage, and, for each of a plurality of operations defined in the first computer program that require the use of temporary storage, to generate program code in the second computer program to utilize the reusable temporary object in performing the operation.

18. The apparatus of claim 17, wherein each of the plurality of operations includes a string concatenation operation.

19. The apparatus of claim 17, wherein the first computer program includes Java compatible source code, and wherein the second computer program includes Java compatible bytecodes.

20. The apparatus of claim 17, wherein the translation program comprises a compiler.

21. The apparatus of claim 17, wherein the translation program comprises an interpreter.

22. The apparatus of claim 17, wherein the reusable temporary object and the plurality of operations are associated with a first execution thread, and wherein the translation program is further configured to generate program code for the second computer program that allocates an additional reusable temporary object storage for handling operations in the second computer program that are associated with a second execution thread and that require the use of temporary storage, and, for each of a second plurality of operations defined in the first computer program, associated with the second execution thread, and that require the use of temporary storage, generate program code in the second computer program to utilize the additional reusable temporary object in performing the operation.

23. The apparatus of claim 17, wherein the reusable temporary object includes a mutable string object.

24. The apparatus of claim 23, wherein the reusable temporary object further includes a character array object referenced by the mutable string object.

25. The apparatus of claim 17, wherein the translation program is further configured to detect a conflicting operation in the first computer program that requires the use of temporary storage, and to generate program code in the second computer program to generate local temporary data storage for use in performing the conflicting string operation.

26. The apparatus of claim 17, wherein the translation program is further configured to determine whether an operation requires temporary data storage.

27. The apparatus of claim 26, wherein the translation program is configured to determine whether an operation requires temporary data storage by determining whether the operation is a predetermined type of operation.

28. The apparatus of claim 27, wherein the translation program is configured to determine whether an operation requires temporary data storage by determining whether the operation is a string concatenation operation.

29. The apparatus of claim 17, wherein the translation program is further configured to generate, for each of the plurality of operations defined in the first computer program that require the use of temporary storage, program code in the second computer program to initialize the reusable temporary object prior to using the reusable temporary object in performing the operation.

30. The apparatus of claim 17, wherein the translation program is further configured to generate, for each of the plurality of operations defined in the first computer program that require the use of temporary storage, program code in the second computer program to determine during execution of the second computer program whether the reusable temporary object is currently in use prior to using the reusable temporary object in performing the operation.

31. The apparatus of claim 17, wherein the translation program is further configured to generate, for each of the plurality of operations defined in the first computer program that require the use of temporary storage, program code in the second computer program to select, during execution of the second computer program, among a plurality of reusable temporary objects to be used in performing the operation.

32. A program product, comprising:

(a) a translation program configured to translate a first computer program into a second computer program, the translation program further configured to generate program code for the second computer program that allocates a reusable temporary object for handling multiple operations in the second computer program that require the use of temporary storage, and, for each of a plurality of operations defined in the first computer program that require the use of temporary storage, to generate program code in the second computer program to utilize the reusable temporary object in performing the operation; and (b) a signal bearing media bearing the translation program.

33. The program product of claim 32, wherein the signal bearing media comprises at least one of a recordable media and a transmission-type media.

* * * * *